United States Patent Office 2,836,583
Patented May 27, 1958

2,836,583

FLUOROPRENE COPOLYMERS

George H. Crawford, Jr., Staten Island, N. Y., assignor, by mesne assignments, to Minnesota Mining and Manufacturing Company, St. Paul, Minn., a corporation of Delaware No Drawing. Application June 1, 1956
Serial No. 588,609

18 Claims. (Cl. 260—82.1)

This invention relates to halogen-containing polymeric compositions. In one aspect, the invention relates to polymeric fluoroprene compositions. More particularly in this aspect, the invention relates to elastomeric polymeric fluoroprene ($CH_2=CF—CH=CH_2$) compositions and the method for their manufacture.

It is an object of this invention to provide new and useful polymeric fluoroprene compositions having desirable chemical and physical characteristics.

Another object of the invention is to provide new and useful polymeric fluoroprene compositions, possessing elastomeric properties together with good chemical and physical characteristics, and which can be easily fabricated into a wide variety of useful articles of improved chemical and physical stability.

Still another object of this invention is to provide new and useful polymeric fluoroprene compositions, serving as protective coatings having the aforementioned characteristics, and which can be readily applied to the surfaces of a wide variety of useful articles.

Still another object of the invention resides in a process for obtaining these polymeric compositions in good yields.

Various other objects and advantages inherent in the invention will become apparent to those skilled in the art from the accompanying description and disclosure.

It has now been found that the copolymerization of fluoroprene and 2-trifluoromethyl-1,3-butadiene, under the conditions more fully hereinafter described, produces an elastomeric polymeric fluoroprene composition possessing good chemical and physical stability and improved resistance to oils, fuels, and various strong chemical reagents. These polymeric products of fluoroprene and 2-trifluoromethyl-1,3-butadiene constitute valuable macromolecules and are adaptable to a wide variety of commercial uses. They possess low temperature flexibility in addition to the aforementioned properties of chemical and physical stability to oils and hydrocarbon fuels. They are also selectively soluble in various commercial solvents and serve as durable, flexible, protective coatings on surfaces which are subjected to environmental conditions in which they may come into contact with any of the aforementioned corrosive substances.

In general, as more fully hereinafter described, the polymeric compositions of the present invention are produced from the polymerization of monomeric mixtures comprising fluoroprene and 2-trifluoromethyl-1,3-butadiene at temperatures between about −20° C. and about 100° C., with intermediate temperature ranges being selected with reference to the specific polymerization system employed. The most useful elastomeric polymeric compositions of the present invention are copolymers produced from monomeric mixtures containing between about 5 mole percent and about 95 mole percent fluoroprene and the remaining major constituent being the 2-trifluoromethyl-1,3-butadiene. The preferred elastomeric copolymeric compositions of the present invention are copolymers produced from monomeric mixtures containing between about 25 mole percent and about 75 mole percent fluoroprene and the remaining major constituent being the 2-trifluoromethyl-1,3-butadiene. Since the reactivities of the fluoroprene and the 2-trifluoromethyl-1,3-butadiene monomers are approximately the same, the finished elastomeric product will contain practically the same proportions of each monomer, as is present in the monomer-feed undergoing polymerization.

The copolymeric compositions of the present invention are preferably prepared by carrying out the polymerization reaction in the presence of a free radical-forming promoter. For this purpose, the polymerization reaction is carried out by employing a water-soluble peroxy-type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt such as ferrous sulfate or ferrous nitrate to accelerate the copolymerization reaction. The water-soluble initiator present in the water-suspension type recipe system comprises between about 0.1 and about 5 parts by weight per 100 parts of total monomers present. The variable-valence metal salt is preferably employed in an amount between about 0.01 and about 0.2 part by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of an aliphatic metal acid-salt having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e. g., perfluorooctanoic acid) or perfluorochlorocarboxylic acid salts (e. g., trifluorochloroethylene telomer acid soaps). The polyfluorocarboxylic acids which may be employed are such as those disclosed in U. S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in copending application Serial No. 501,782, filed April 18, 1955, now U. S. Patent No. 2,806,867, as being useful dispersing agents in polymerization reactions. In general, these emulsifying agents are present in an amount between about 0.5 and about 10 parts by weight per 100 parts of total monomers present.

The polymerization reaction is preferably conducted under neutral conditions, in order to prevent gelling of the resulting polymeric product, a condition which often causes slowdown or stoppage of the polymerization reaction. In this respect, it should be noted that it is sometimes necessary to maintain the pH of the system at a pH of about 7.0 by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloroacetyl peroxide, 2,4-dichlorobenzoyl peroxide, dichlorofluoroacetyl peroxide, benzoyl peroxide and ditertiary butyl peroxide.

As previously indicated, the polymerization reaction is carried out, in general, at a temperature between about $-20°$ C. and about $100°$ C. When the polymerization reaction is carried out employing a water-suspension type recipe, temperatures between about $10°$ C. and about $50°$ C. are preferably employed. When the polymerization reaction is carried out in the presence of an organic peroxide initiator in a bulk-type polymerization system, temperatures over the entire range of between about $-20°$ C. and about $100°$ C. are preferably employed depending upon the decomposition temperature of the promoter. The polymerization reactions described herein to produce the polymeric compositions of the present invention are carried out under autogenous conditions of pressure. These pressures may vary from about atmospheric pressure to as high as 2000 pounds per square inch. However, in general, these pressures do not rise above approximately 500 pounds per square inch.

As previously indicated, the polymeric compositions of the present invention are particularly suitable and useful when employed in the form of durable, flexible coatings on a wide variety of surfaces, and particularly on surfaces which are subjected to distortion in normal use, such as fabric surfaces. For this purpose, the polymeric composition may be dissolved in various commercial solvents. Particularly useful solvents comprise the aliphatic and aromatic esters, ketones and halogenated hydrocarbons. Typical examples of these solvents are diisobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces the molecular weight of the polymeric compositions and increases their solubility, without affecting, unduly, the overall yield. Suitable polymerization modifiers include chloroform ($CHCl_3$), Freon-113 ($CF_2ClCFCl_2$), carbon tetrachloride ($CCl_4$), trichloroacetyl chloride ($CCl_3COCl$), bromotrichloroethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following example is offered for a better understanding in producing the thermoplastic copolymeric compositions of the present invention and is not to be construed as limiting its scope.

Example 1

A heavy-walled, glass polymerization tube of about 20 ml. capacity was flushed with nitrogen. Thereafter, there was charged to this polymerization tube 5% of a solution prepared by dissolving 5 grams of potassium stearate in 150 ml. of water, adjusted to a pH of 11 with potassium hydroxide. The contents of the tube were then frozen, and thereafter there was added to the tube 5% of a solution prepared by dissolving 1 gram of potassium persulfate in 20 ml. of water. The contents of the tube were then once more frozen, and thereafter there was added to the tube 5% of a solution prepared by dissolving 0.4 gram of sodium metabisulfite and 0.5 gram of borax in 30 ml. of water. The entire contents of the tube were once more frozen, and the tube was next connected to a gas-transfer system and evacuated at liquid nitrogen temperature. To the frozen contents of the tube were added, by distillation, 1.85 grams of fluoroprene and 3.15 grams of 2-trifluoromethyl-1,3-butadiene, which comprised a 50/50 molar ratio. After the contents of the tube were thoroughly frozen with liquid nitrogen, the tube was evacuated and sealed.

The polymerization tube and contents were then agitated in a temperature-regulated water-bath at $50°$ C. for a period of 24 hours. At the end of this time, the contents of the tube were coagulated by freezing. The coagulated product was then removed from the tube, washed with hot water and then dried to constant weight in vacuo at $35°$ C. A copolymeric rubbery product was obtained, in an amount of 4.8 grams, which was found, upon analysis, to comprise 52 mole percent 2-trifluoromethyl-1,3-butadiene, and the remaining major constituent, fluoroprene, being present in an amount of 48 mole percent. The copolymer was thus obtained in an amount corresponding to a 97.5% conversion.

A sample of the raw copolymer was compression molded at a temperature of $250°$ F. for a period of 5 minutes. After molding, it was found that the sample retained its rubbery characteristics and was firm and flexible.

As previously indicated, the polymeric compositions of the present invention possess highly desirable physical and chemical properties which make them useful for fabrication of a wide variety of thermoplastic articles, or for the application to various surfaces as protective coatings. In such uses, a raw elastomeric copolymer, such as is produced in accordance with the procedure set forth in the above examples, is extruded or pressed into sheets at temperatures between about $250°$ F. and about $400°$ F. and at a pressure between about 500 and about 15,000 pounds per square inch for a period of about 5 to about 60 minutes. Thereafter, various articles can be molded from preforms cut from sheets and extruded stock in the form of gaskets, diaphragms, packings, etc. In this respect, it is preferred in such applications, that the raw copolymer also includes various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating composition, various vulcanizing agents. In the latter case, supplementary heat-treatment of the coating is required, either during the solvent-removal step or thereafter. After the solvent has been completely evaporated, the coated surface is ready for use. In this respect, it should be noted that the polymeric coating composition may be applied to the surface either as a single coating, or, if so desired, the protective coating may be built-up by the application of several layers, each layer being permitted to harden by solvent evaporation before the next layer is applied. Furthermore, if so desired, the protective coatings, or the polymeric composition, when obtained in the form of sheets, may be suitably pigmented.

Other uses for the polymeric compositions of the present invention reside in the fabrication of belting, hose, mountings, piston and pump-valves, sheet or valve disks, rolls, tubing, pressure-sensitive tape for electrical insulation purposes, grommets, or as adhesives for fastening a rubber surface to a metal or another rubber surface.

Since certain changes may be made in carrying out the process of the present invention in producing the desired polymeric compositions without departing from the scope of the invention, it is intended that all matter contained in the above description is to be interpreted as illustrative and not in a limiting sense.

I claim:

1. A process which comprises polymerizing fluoroprene and 2-trifluoromethyl-1,3-butadiene.

2. A process which comprises polymerizing fluoroprene and 2-trifluoromethyl-1,3-butadiene at a temperature between about −20° C. and about 100° C.

3. A process which comprises polymerizing fluoroprene and 2-trifluoromethyl-1,3-butadiene in the presence of a polymerization promoter comprising a peroxy compound at a temperature between about −20° C. and about 100° C.

4. A process which comprises polymerizing fluoroprene and 2-trifluoromethyl-1,3-butadiene in the presence of a polymerization promoter comprising an inorganic peroxy compound at a temperature between about 10° C. and about 50° C.

5. A process which comprises polymerizing fluoroprene and 2-trifluoromethyl-1,3-butadiene in the presence of a polymerization promoter comprising an organic peroxy compound at a temperature between about −20° C. and about 100° C.

6. A process which comprises polymerizing a monomeric mixture of fluoroprene and 2-trifluoromethyl-1,3-butadiene, said mixture containing between about 5 mole percent and about 95 mole percent fluoroprene and the remaining major constituent being the 2-trifluoromethyl-1,3-butadiene.

7. A process which comprises polymerizing a monomeric mixture of fluoroprene and 2-trifluoromethyl-1,3-butadiene, said mixture containing between about 5 mole percent and about 95 mole percent fluoroprene and the remaining major constituent being the 2-trifluoromethyl-1,3-butadiene at a temperature between about −20° C. and about 100° C.

8. A process which comprises polymerizing a monomeric mixture of fluoroprene and 2-trifluoromethyl-1,3-butadiene, said mixture containing between about 5 mole percent and about 95 mole percent fluoroprene and the remaining major constituent being the 2-trifluoromethyl-1,3-butadiene in the presence of a polymerization promoter comprising a peroxy compound at a temperature between about −20° C. and about 100° C.

9. A process which comprises polymerizing a monomeric mixture of fluoroprene and 2-trifluoromethyl-1,3-butadiene, said mixture containing between about 5 mole percent and about 95 mole percent fluoroprene and the remaining major constituent being the 2-trifluoromethyl-1,3-butadiene in the presence of a polymerization promoter comprising an inorganic peroxy compound at a temperature between about 10° C. and about 50° C.

10. A process which comprises polymerizing a monomeric mixture of fluoroprene and 2-trifluoromethyl-1,3-butadiene, said mixture containing between about 5 mole percent and about 95 mole percent fluoroprene and the remaining major constituent being the 2-trifluoromethyl-1,3-butadiene in the presence of a polymerization promoter comprising an organic peroxy compound at a temperature between about −20° C. and about 100° C.

11. A process which comprises polymerizing a monomeric mixture of fluoroprene and 2-trifluoromethyl-1,3-butadiene, said mixture containing between about 25 mole percent and about 75 mole percent fluoroprene and the remaining major constituent being the 2-trifluoromethyl-1,3-butadiene.

12. A process which comprises polymerizing a monomeric mixture of fluoroprene and 2-trifluoromethyl-1,3-butadiene, said mixture containing between about 25 mole percent and about 75 mole percent fluoroprene and the remaining major constituent being the 2-trifluoromethyl-1,3-butadiene at a temperature between about −20° C. and about 100° C.

13. A process which comprises polymerizing a monomeric mixture of fluoroprene and 2-trifluoromethyl-1,3-butadiene, said mixture containing between about 25 mole percent and about 75 mole percent fluoroprene and the remaining major constituent being the 2-trifluoromethyl-1,3-butadiene in the presence of a polymerization promoter comprising a peroxy compound at a temperature between about −20° C. and about 100° C.

14. A process which comprises polymerizing a monomeric mixture of fluoroprene and 2-trifluoromethyl-1,3-butadiene, said mixture containing between about 25 mole percent and about 75 mole percent fluoroprene and the remaining major constituent being the 2-trifluoromethyl-1,3-butadiene in the presence of a polymerization promoter comprising an inorganic peroxy compound at a temperature between about 10° C. and about 50° C.

15. A process which comprises polymerizing a monomeric mixture of fluoroprene and 2-trifluoromethyl-1,3-butadiene, said mixture containing between about 25 mole percent and about 75 mole percent fluoroprene and the remaining major constituent being the 2-trifluoromethyl-1,3-butadiene in the presence of a polymerization promoter comprising an organic peroxy compound at a temperature between about −20° C. and about 100° C.

16. A copolymer of fluoroprene and 2-trifluoromethyl-1,3-butadiene.

17. A copolymer of about 5 to about 95 mole percent fluoroprene and correspondingly about 95 to about 5 mole percent 2-trifluoromethyl-1,3-butadiene.

18. A copolymer of about 25 to about 75 mole percent fluoroprene and correspondingly about 75 to about 25 mole percent 2-trifluoromethyl-1,3-butadiene.

References Cited in the file of this patent

UNITED STATES PATENTS

| | | |
|---|---|---|
| 2,446,382 | Mochel | Aug. 3, 1948 |
| 2,490,753 | Hill | Dec. 6, 1949 |